(12) United States Patent
Stotkiewitz et al.

(10) Patent No.: US 7,178,550 B2
(45) Date of Patent: Feb. 20, 2007

(54) PRESSURE CONTROL VALVE FOR A PACKAGING CONTAINER AND DEVICE FOR ATTACHING THE PRESSURE CONTROL VALVE TO A MATERIAL WEB

(75) Inventors: Herbert Stotkiewitz, Bietigheim-Bissingen (DE); Juergen Haak, Stuttgart (DE); Thomas Fischer, Remshalden-Geradstetten (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 10/486,986

(22) PCT Filed: Aug. 14, 2002

(86) PCT No.: PCT/DE02/02976

§ 371 (c)(1),
(2), (4) Date: Feb. 18, 2004

(87) PCT Pub. No.: WO03/018428

PCT Pub. Date: Mar. 6, 2003

(65) Prior Publication Data

US 2004/0187924 A1    Sep. 30, 2004

(30) Foreign Application Priority Data

Aug. 21, 2001   (DE) ................. 101 40 854

(51) Int. Cl.
*F16K 15/14*   (2006.01)
*B65D 31/01*   (2006.01)

(52) U.S. Cl. ............. 137/246; 137/852; 137/859; 383/103; 426/118; 493/216
(58) Field of Classification Search ........ 137/246, 137/843, 852, 859; 383/100, 103; 426/118; 429/213
See application file for complete search history.

(56) References Cited

U.S. PATENT DOCUMENTS

| 3,595,467 | A | * | 7/1971 | Goglio ............... 383/103 |
| 4,134,535 | A | * | 1/1979 | Barthels et al. ......... 383/103 |
| 4,444,219 | A |   | 4/1984 | Hollenstein |
| 4,690,667 | A |   | 9/1987 | Domke |
| 4,890,637 | A | * | 1/1990 | Lamparter ............ 137/246 |
| 5,354,133 | A |   | 10/1994 | Rapparini |
| 5,427,829 | A |   | 6/1995 | Mochizuki et al. |
| 5,427,839 | A |   | 6/1995 | Bucher |
| 5,515,994 | A | * | 5/1996 | Goglio ............... 426/118 |
| 5,584,409 | A |   | 12/1996 | Chemberlen |
| 5,782,266 | A | * | 7/1998 | Domke ............... 383/103 |
| 5,992,442 | A | * | 11/1999 | Urquhart et al. ......... 137/246 |
| 6,056,439 | A | * | 5/2000 | Graham ............... 383/103 |

* cited by examiner

*Primary Examiner*—John Rivell
(74) *Attorney, Agent, or Firm*—Ronald E. Greigg

(57) ABSTRACT

A pressure control valve for a packaging container includes a supporting body having a recess a is disposed in an axially captive fashion either by means of gluing or by means of securing projections A device for attaching the pressure control valve to a material web has a stroke die and a sealing die that cooperates with the stroke die and contains a needle holder for producing holes in the material web.

12 Claims, 3 Drawing Sheets

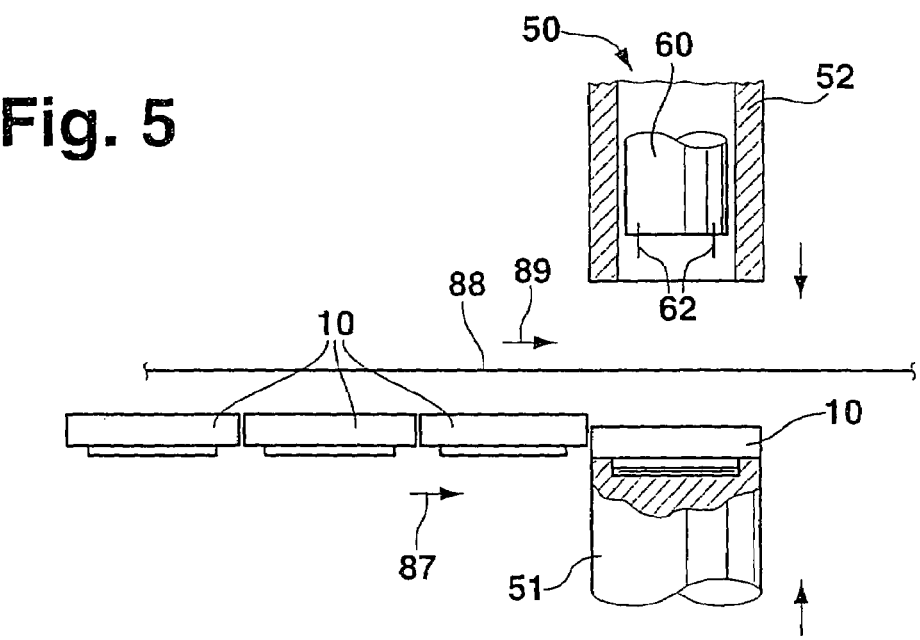
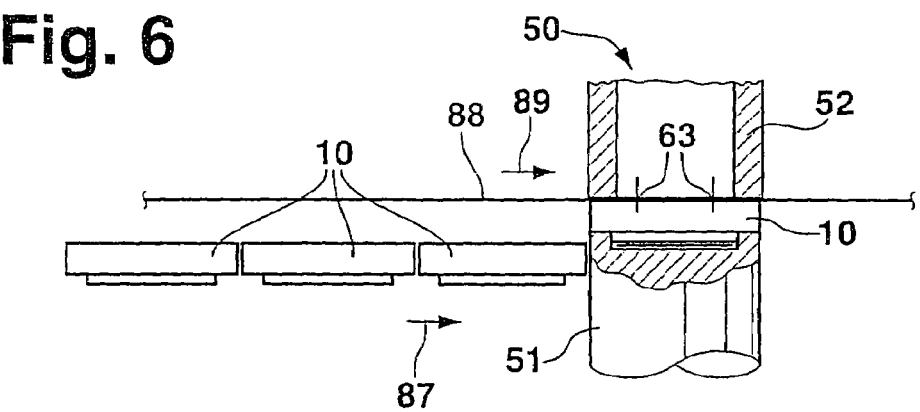
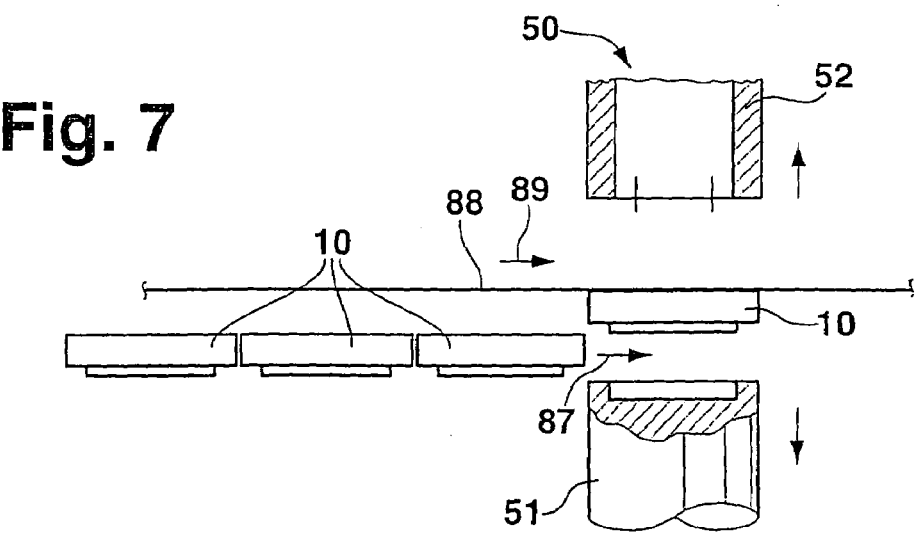

US 7,178,550 B2

PRESSURE CONTROL VALVE FOR A PACKAGING CONTAINER AND DEVICE FOR ATTACHING THE PRESSURE CONTROL VALVE TO A MATERIAL WEB

CROSS-REFERENCE TO RELATED APPLICATIONS

This application is a 35 USC 371 application of PCT/DE 02/02976 filed on Aug. 14, 2002.

BACKGROUND OF THE INVENTION

Field of the Invention

The invention relates to an improved pressure control valve for a packaging container formed from a material web.

A pressure control valve known from DE 31 47 321 C2 has a shaped supporting body with a circumferential flange region along its wall; the flange region can be attached to the inside of a material web that forms the packaging container. At the bottom of the supporting body, a membrane is provided, whose edge has play in relation to the supporting body. The membrane is clamped against the bottom of the supporting body by a hold-down element embodied in the shape of a bone when viewed from above. The known pressure control valve consequently requires three components, which makes the installation of the membrane and the hold-down element in the support body relatively complex.

SUMMARY AND ADVANTAGES OF THE INVENTION

The pressure control valve for a packaging container according to the invention, has the advantage over the prior art that it is only comprised of two components and is consequently less expensive to produce.

In a preferred embodiment of the invention, the membrane is attached to the supporting body by means of glue. This makes it possible to produce a particularly flat pressure control valve. It is also particularly advantageous to provide an annular groove in the supporting body in the region of the openings in the membrane. This makes it possible to define the spatial distribution of the sealing fluid and to define the length of the conduit for the gas flow. In another preferred embodiment of the invention, at least one hold-down element that is of one piece with the supporting body holds the membrane in an axially fixed, but radially movable fashion. This embodiment requires no additional openings in the membrane.

BRIEF DESCRIPTION OF THE DRAWINGS

Two exemplary embodiments of the invention are shown in the drawings and will be explained in detail below with reference to the drawings, in which.

DESCRIPTION OF THE PREFERRED EMBODIMENTS

Figure 1:
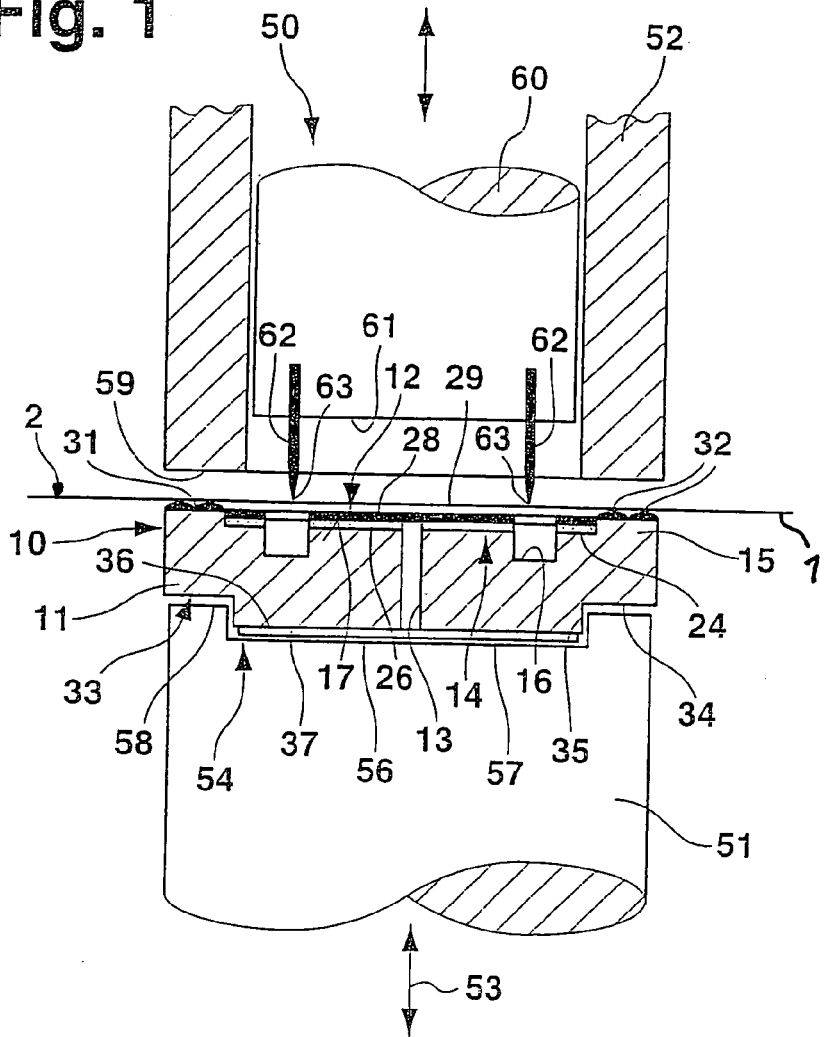
FIG. 1 is a longitudinal section through a first pressure control valve according to the invention and a device for attaching the pressure control valve to a material web.
Figure 2:
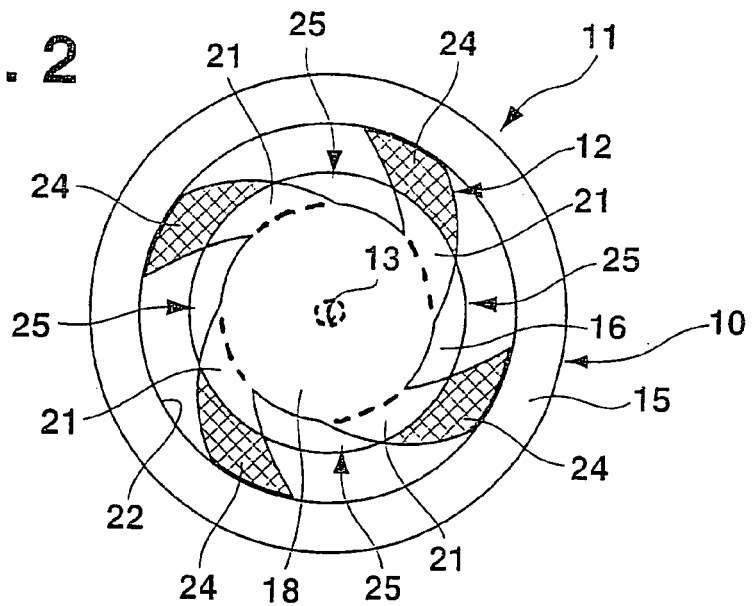
FIG. 2 is a top view of the pressure control valve according to FIG. 1.

FIGS. 1 and 2 show a first pressure control valve 10 which can be attached to one side 1 of a material web 2, preferably by means of an ultrasonic welding process. A packaging container, not shown, is then formed out of a section of the material web 2, with the side 1 of the material web 2 constituting the inside of the packaging container. The packaging container can be filled with a gas-emitting foodstuff, in particular coffee or the like, and in a final state, is closed in an airtight fashion.

The pressure control valve 10 is comprised of only two components: a rigid supporting body 11 and a flexible membrane 12. The supporting body 11 is made of plastic and is embodied in the form of a rotationally symmetrical flat part with an opening 13 for the gas, which is disposed in the center in the exemplary embodiment. The opening 13, though, can also be disposed outside the center. It is likewise possible for a number of openings 13 to be provided.

On the side oriented toward the material web 2, the supporting body 11 is provided with a flat recess 14, whose edge is delimited by a circumferential edge region 15. Concentric to the opening 13, spaced apart from the edge region 15, a circular annular groove 16 is provided at the bottom 17 of the recess 14.

The membrane 12 is also made of plastic and is disposed inside the recess 14 at the same height as the bottom 17 of the recess. The membrane 12 has a round central region 18, which covers the opening 13 and extends out to the annular groove 16 (FIG. 2). Four membrane arms 21, which are disposed at uniform angular intervals and are curved when viewed from above, extend radially out from the central region 18 to the wall 22 of the recess 14. In the regions between the annular groove 16 and the wall 22, the membrane arms 21 are attached to the bottom 17 of the recess 14 by means of glue 24.

Between the membrane arms 21 there are membrane-free intermediate zones 25, which function as openings for the gas. The number and geometric design of the membrane arms 21 can be used to influence the rigidity of the membrane 12 and consequently the opening pressure of the pressure control valve 10. The intermediate zones 25 and the membrane arms 21 can be cut out from the membrane 12 by means of a stamping procedure.

A sealing fluid 26, preferably a certain quantity of silicone oil, is contained between the bottom 17 of the recess 14 and the central region 18 of the membrane 12. It is also essential that the depth of the recess 14 and the thickness of the membrane 12 be selected to leave a certain distance or gap 29 between the top side 28 of the membrane 12 and the side 1 of the material web 2 so that the material web 2 can only exert an extremely small amount of pressure on the membrane 12, at least in the central region 18.

A number of circumferential protrusions 32 are provided on the top side 31 of the supporting body 11 in the vicinity of the edge region 15. If the pressure control valve 10 is ultrasonically welded to the material web 2, these protrusions 32 permit a particularly intimate connection. The underside 33 of the pressure control valve 10 has a circumferential supporting region 34 aligned with the edge region 15 and the protrusions 32. The supporting region 34 transitions by means of a step 35 into a central, lower base zone 36. A filter element in the form of a filter paper 37 that is permeable to gas, but impermeable to solids, can be provided in the region of the base zone 36, in particular covering the opening 13. Preferably the filter paper 37 is attached to the base zone 36 by means of glue.

A device 50 shown in FIG. 1 serves to attach the pressure control valve 10 to the material web 2. The device 50 has a stroke die 51 and has a sealing die 52 that cooperates with the stroke die 51. The stroke die 51, which can be moved up and down in the direction of the arrow 53, has a seat 54 for the pressure control valve 10 corresponding to the base zone 36. It is also essential that the depth of the seat 54 be great enough that a gap 57 remains between the bottom 56 of the seat 54 and the underside 33 of the pressure control valve 10 and optionally the filter paper 37. Consequently only the supporting region 34 of the pressure control valve 10 rests against the circular ring-shaped raised edge region 58 of the stroke die 51. A positive engagement is produced in the radial direction between the seat 54 and the pressure control valve 10.

The sealing die 52, which can also move up and down, is tubular; the underside 59 of the sealing die 52 oriented toward the material web 2 covers over at least the protrusions 32, but preferably covers over the entire edge region 15 of the pressure control valve 10. Inside the sealing die 52, a needle holder 60 is provided, which can move up and down independently of the sealing die 52 and which, in the exemplary embodiment, has four needles 62 protruding from its underside 61. The needles 62 are used to produce holes 63 in the material web 2. In the exemplary embodiment, the needles 62 are positioned in the needle holder 60 so that the needles 62 are aligned with the intermediate zones 25 of the membrane 12 and the annular groove 16 in the supporting body 11.

Figure 3:
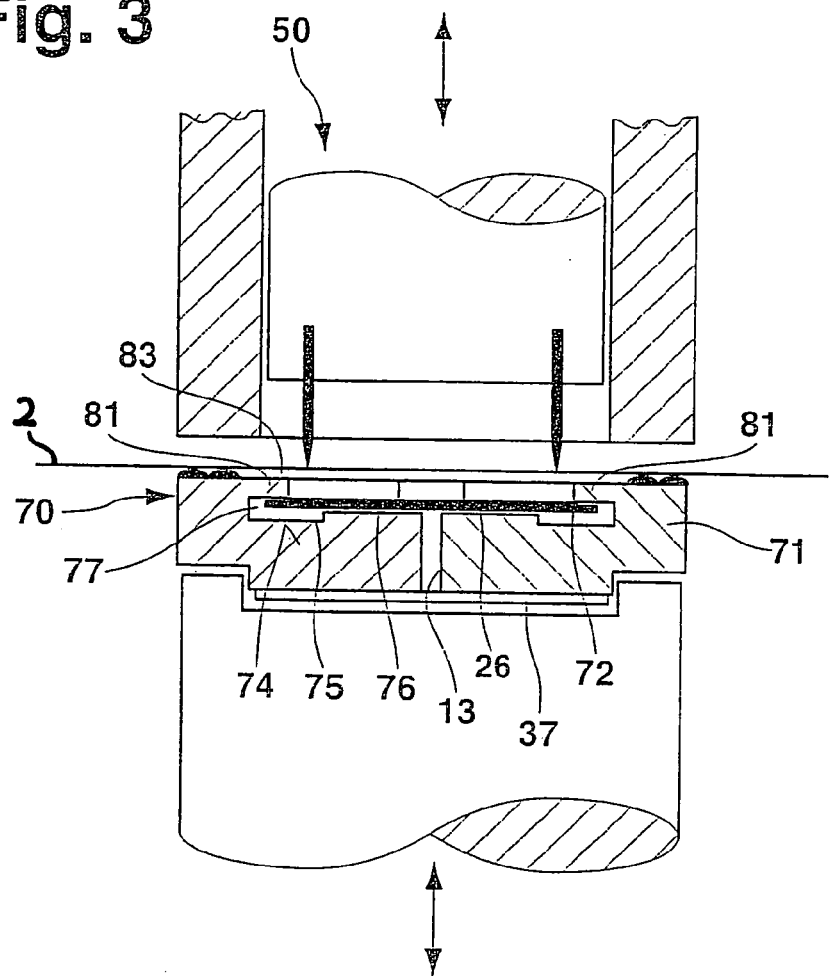
FIG. 3 is a longitudinal section through a second pressure control valve according to the invention in a device for attaching the pressure control valve to a material web.
Figure 4:
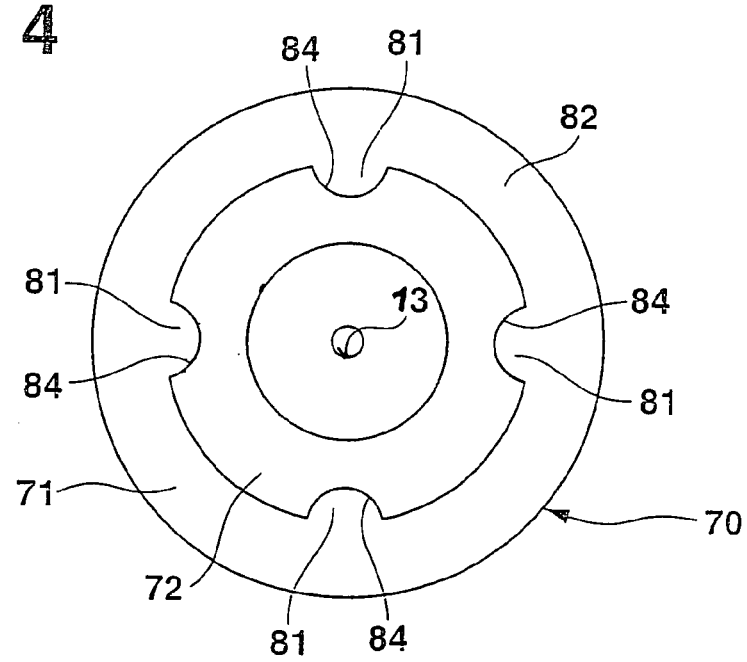
FIG. 4 is a top view of the pressure control valve according to FIG. 3, and FIGS. 5 to 7 show simplified side views of a device for attaching the pressure control valves according to the invention to a material web during various phases of operation.

FIGS. 3 and 4 show a second pressure control valve 70 according to the invention that is likewise comprised of two components: the supporting body 71 and the membrane 72. The description below will concern only the significant differences in relation to the first pressure control valve 10; shared features are provided with the same reference numerals.

The pressure control valve 70, which is likewise embodied as rotationally symmetrical, has a recess 74, from whose bottom 75 a centrally disposed, raised region 76 protrudes. The membrane 72 rests loosely against this region 76, which is also in contact with the sealing fluid 26.

The membrane 72 has a round form and the diameter of the membrane 72 is less than the inner diameter of the recess 74 so that a gap 77 is produced between the membrane 72 and the edge of the recess 74. In the exemplary embodiment, four securing projections 81 offset from one another by 90° are provided in order to affix the membrane 72 in the supporting body 71 in an axially captive fashion. The securing projections 81 are of one piece with the edge region 82 of the pressure control valve 70 and extend radially inward; the top surface 83 of the edge region 82 is embodied as flat, with the exception of the protrusions 32.

In the top view (FIG. 4), the securing projections 81 are each provided with a radius 84. Between the underside 85 of the securing projections 81 and the bottom 75 of the recess 74, a space remains that is greater than the thickness of the membrane 72; the underside 85 prevents the membrane 72 from lifting up from the raised region 76.

In order to mount the membrane 72 onto the supporting body 71, the membrane 72 is bent so that it can be slid under the securing projections 81. Alternatively, it is also conceivable for the securing projections 81 to initially protrude upward at right angles so that the membrane 72 can be inserted into the recess 74 without being bent and then the securing projections 81 can be moved or bent over in a radially inward direction by means of a pressing process.

It should also be mentioned that in lieu of four securing projections 81, it is likewise possible for a different number of securing projections to be provided. It is also conceivable to use a crosspiece that extends laterally across the recess 74 and is of one piece with the supporting body 71, as long as this still permits installation of the membrane 72. The only essential feature of the securing projections 81 is that they function as hold-down elements for the membrane 72 in its radial edge regions and press it axially against the opening 13; it must be possible, though, for the membrane 72 to lift up from the raised region 76 starting at a particular excess pressure in the opening 13. Furthermore, it is quite possible for the membrane 72 to move radially in the recess 74 since this does not impair its intrinsic valve function.

In order to attach the pressure control valve 70 to the material web 2, it is possible to use the same device 50 as for the pressure control valve 10 since the relevant features of the pressure control valve 10 and the pressure control valve 70 are the same. Moreover, the placement of the needles 62 is not critical in the pressure control valve 70.

With regard to the function of the pressure control valves 10 and 70, it should be noted that in the case of the pressure control valve 10, starting at a certain excess pressure in the packaging container generated by the gas-emitting filling material, the gas passes first through the filter paper 37 that is likewise provided. After this, the gas travels through the opening 13 and, via a conduit that is formed between the bottom 17 of the recess 14 and the membrane 12 when the latter lifts up starting at a certain excess pressure in the packaging container, into the region of the annular groove 16, and finally into the membrane-free intermediate zones 25. From there, the gas is conveyed out of the packaging container via the holes 63 in the material web 2.

The opening pressure at which the membrane 12 lifts up from the bottom 17 so that the conduit for the gas can be formed should be as low as possible. The opening pressure can be influenced structurally, in particular by means of the thickness and the material of the membrane 12 and the distance between the opening 13 and the annular groove 16 or the membrane-free intermediate zones 25.

In the case of the pressure control valve 70, the gas (after likewise passing through the filter paper 37) travels through the opening 13 and the raised central region 76 in the bottom 75 of the recess 74, and from there, travels out of the packaging container via the gap 77 and the holes 63. The opening pressure of the membrane 72 is influenced in particular by means of the thickness and the material of the membrane 72 and the distance between the opening 13 and the edge of the central region 76.

In order to explain the operation of the device 50, reference will finally be made to FIGS. 5 to 7. It is naturally also possible to use the pressure control valve 70 in lieu of the pressure control valve 10. The pressure control valves 10 are supplied cyclically to the stroke die 51 in the direction of the arrow 87. Above the pressure control valves 10 is the material web 2, initially in the form of an endless web 88, which is cyclically moved the length respectively required for one packaging container in the direction of the arrow 89 by a feeding mechanism that is not shown. In a first step, an initially lowered stroke die 51 receives a pressure control valve 10, while the sealing die 52 and its needle holder 60 are disposed in a raised position above the web 88 (FIG. 5). Then, as shown in FIG. 6, the stroke die 51 is raised to press the pressure control valve 10 against the web 88 and the sealing die 52 is lowered to press against the web 88. This attaches the side 1 of the web 88 to the edge region 15 of the pressure control valve 10; if this is achieved through ultrasonic welding, then the protrusions 32 also come into play. Depending on the material of the web 88 and the size and number of holes 63, it can be advantageous for the needle holder 60 and the needles 62 to produce the holes 63 in the web 88 only after the web 88 is fixed between the pressure control valve 10 and the stroke die 51, thus preventing the web 88 from being pulled into the recess 14. Finally, as shown in FIG. 7, the stroke die 51 and the sealing die 52 are moved away from the web 88 again in order to release it for the subsequent advancing motion.

The foregoing relates to preferred exemplary embodiments of the invention, it being understood that other variants and embodiments thereof are possible within the spirit and scope of the invention, the latter being defined by the appended claims.

The invention claimed is:

1. A two-component pressure control valve (10) for a packaging container having at least one opening (63) in a wall of the packaging container, comprising
   a cup-shaped, rigid supporting body (11), having a circumferential edge region (15) including a top surface (31) which can be attached to a material web (2) forming the inside (1) of the packaging container, and a (17) portion having at least one opening (13) for gas, and
   a valve membrane (12), closing the at least one opening (13) in the supporting body (11) with the interposition of a sealing fluid (26), up until a certain excess pressure in the packaging container and which, when the excess pressure is exceeded, forms a conduit inside the edge region (15) for gas flowing outward of the packaging container through the at least one opening (63) in the wall of the packaging container the membrane (12) being attached to the supporting body (11) in captive fashion,
   wherein the membrane (12) is attached to the supporting body (11) by means of glue in at least two opposing edge regions between which the at least one opening (13) in the supporting body is disposed; the membrane (12) being attached to the supporting body (11) with a space (29) formed between the a top surface (28) of the membrane (12) and the top surface of the edge region (15) of the supporting body (11), the space (29) permitting the gas to travel out toward the at least one opening (63) in the wall of the packaging container,
   wherein the supporting body (11) is embodied as a rotationally symmetrical flat body, wherein the membrane (12) is round and has a diameter that corresponds to the inner diameter of the edge region (15), and wherein at least one opening (25) for the gas is provided in the membrane (12), and
   wherein the membrane (12) includes a central, preferably circular region (18) covering over the at least one opening (13) in the supporting body (11), wherein membrane-free incisions that constitute the at least one opening (25) extend inward from the circumference of the membrane (12), and wherein between the incisions, approximately radially disposed membrane sections (21) are provided, which are at least partially glued to the supporting body (11).

2. The pressure control valve according to claim 1, wherein the side of the supporting body (11) oriented toward the membrane (12) comprises a circumferential annular groove (16) that radially adjoins the central region (18) of the membrane (12) and extends to the regions of the membrane sections (21) attached to the supporting body (11) by means of glue.

3. The pressure control valve according to claim 1, further comprising a filter paper element (37), which is permeable to gas but impermeable to solids on the underside of the supporting body (11) oriented away from the inside of the packaging container, at least in the region of the at least one opening (13).

4. The pressure control valve according to claim 1, further comprising at least one circumferential protrusion (32) on the top surface (31) of the edge region (15) of the supporting body (11), in the region in which it is attached to the packaging container or the material web (2), to allow the supporting body (11) to be ultrasonically welded to the material web (2).

5. The pressure control valve according to claim 1, further comprising at least one centering region (35) on the underside of the supporting body (11) oriented away from the packaging container or the material web (2).

6. A two-component pressure control valve (70) for a packaging container having at least one opening (63) in a wall of the packaging container, comprising
   a cup-shaped, rigid supporting body (71), having a circumferential edge region (82) including a top surface (83) which can be attached to a material web (88) forming the inside (1) of the packaging container, the supporting body (71) having a recess (74) with a bottom (75) surrounded by the circumferential edge region (82), and at least one opening (13) for gas provided in the supporting body (71) through the bottom (75) of the recess (74), and
   a valve membrane (72), closing the at least one opening (13) in the supporting body (71) with the interposition of a sealing fluid (26), up until a certain excess pressure in the packaging container and which, when the excess pressure is exceeded, forms a conduit inside the edge region (15) for gas flowing outward of the packaging container through the at least one opening (63) in the wall of the packaging container, the membrane (72) being attached to the supporting body (71) in captive fashion, wherein the membrane (72) is disposed against the bottom (75) of the supporting body (71) with play at an outer circumferential edge of the membrane and is axially fixed in relation to the bottom (75) by means of at least one hold-down element (81) that is of one piece with the edge region (82), wherein the supporting body (71) comprises a rotationally symmetrical flat body and wherein the membrane (72) has an unperforated, round form whose diameter is smaller than the bottom (75) of the supporting body (71) delimited by the edge region (82) so that a gap (77) is produced between the outer circumferential edge of the membrane (72) and the circumferential edge region (82) of the supporting body (71), the gap (77) forming a part of the conduit for gas flowing outward of the packaging container.

7. The pressure control valve according to claim 6, wherein the at least one hold-down element comprises a securing projection (81) that points radially inward from the edge region (82).

8. The pressure control valve according to claim 6, wherein the sealing fluid (26) is disposed inside a raised central region (76) of the bottom (75) of the recess (74) that also contains the at least one opening (13).

9. The pressure control valve according to claim 6, further comprising a filter paper element (37), which is permeable to gas but impermeable to solids on the underside of the supporting body (71) oriented away from the inside of the packaging container, at least in the region of the at least one opening (13).

10. The pressure control valve according to claim 6, further comprising at least one circumferential protrusion (32) on the top surface (83) of the edge region (15) of the supporting body (71), in the region in which it is attached to the packaging container or the material web (88), to allow the supporting body (71) to be ultrasonically welded to the material web (88).

11. A device (50) for attaching a pressure control valve (10; 70) to a packaging container, the device comprising
a stroke die (51) that receives the pressure control valve (10; 70),
a sealing die (52), which can be moved against a top side (31; 83) of the pressure control valve (10; 70) and a material web (2, 88) that constitutes the packaging container; and
a needle holder (60) with at least one needle (62) inside the sealing die (52), which needle holder can be moved up and down inside the sealing die (52) in order to produce at least one opening (63) in the material web (2, 88).

12. The device according to claim 11, wherein the pressure control valve (10; 70) is received in a positively engaging fashion in a seat (54) of the stroke die (51) and a gap (57) is formed in the seat (54) between a bottom (56) of the seat (54) and a middle region (36) of the pressure control valve (10; 70) aligned with the needle holder (60).

* * * * *